United States Patent [19]

Farrell

[11] Patent Number: 4,836,580
[45] Date of Patent: Jun. 6, 1989

[54] CONDUIT CONNECTOR

[75] Inventor: Grant D. Farrell, Mississauga, Canada

[73] Assignee: Scepter Manufacturing Company Limited, Toronto, Canada

[21] Appl. No.: 162,478

[22] Filed: Mar. 1, 1988

[51] Int. Cl.[4] .............................................. F16L 35/00
[52] U.S. Cl. ..................... 285/24; 285/319; 285/423; 285/156; 285/161
[58] Field of Search ............... 285/921, 903, 319, 320, 285/322, 323, 382.7, 321, 316, 423, 24, 156, 161

[56] References Cited

U.S. PATENT DOCUMENTS

| | | |
|---|---|---|
| 3,785,682 | 1/1974 | Schaller et al. . |
| 3,897,090 | 7/1975 | Moroschak . |
| 3,899,198 | 8/1975 | Moroschak . |
| 4,006,922 | 2/1977 | Bartholomew . |
| 4,045,055 | 8/1977 | Blakely .......................... 285/322 X |
| 4,067,534 | 1/1978 | Frey . |
| 4,084,844 | 4/1978 | Abner . |
| 4,168,091 | 9/1979 | Boomgarden et al. . |
| 4,247,136 | 1/1961 | Fouss et al. . |
| 4,248,459 | 2/1961 | Pate et al. . |
| 4,273,367 | 6/1981 | Keeney et al. . |
| 4,286,808 | 9/1981 | Fouss et al. . |
| 4,368,904 | 1/1963 | Lanz . |
| 4,423,891 | 1/1984 | Menges . |
| 4,440,425 | 4/1984 | Paste et al. . |
| 4,441,745 | 4/1984 | Nicholas . |
| 4,443,031 | 4/1984 | Borsh et al. . |
| 4,462,622 | 7/1984 | Barzuza .......................... 285/921 X |
| 4,470,622 | 9/1984 | Pate et al. . |
| 4,480,855 | 11/1984 | Rosenbaum . |
| 4,494,779 | 1/1985 | Neff et al. . |
| 4,509,911 | 4/1984 | Rosenbaum . |
| 4,513,998 | 4/1985 | Grossauer . |
| 4,524,999 | 6/1985 | Pate et al. . |
| 4,542,922 | 9/1985 | Grossauer . |
| 4,575,132 | 3/1966 | Nattel . |
| 4,575,133 | 3/1986 | Nattel . |
| 4,621,842 | 11/1986 | Kowal et al. ........................ 285/322 |
| 4,647,074 | 3/1987 | Pate et al. . |
| 4,711,472 | 12/1987 | Schnell .......................... 285/903 X |
| 4,747,621 | 5/1988 | Gons et al. ...................... 285/903 X |

Primary Examiner—Dave W. Arola
Attorney, Agent, or Firm—Brian W. Gray

[57] ABSTRACT

A connection device for use in securing an end of a corrugated pipe to a fitting such as a terminal box connector or a pipe-to-pipe coupling has an array of fingers extending axially from an annular ring, for insertion into the fitting. Enlarged head portions at the inner ends of the fingers serve to engage the ribs or corrugations on the pipe outer surface, when a pipe is inserted therepast, and also provide a differentiated camming action to secure engagement of the head portions with a corrugation of the pipe and to prevent withdrawal of the pipe from the fitting. The fitting with which the device is combined also has an axially extended inner peripheral seat against which the pipe corrugations seat, to preclude passage of concrete betwen the pipe and the fitting.

22 Claims, 4 Drawing Sheets

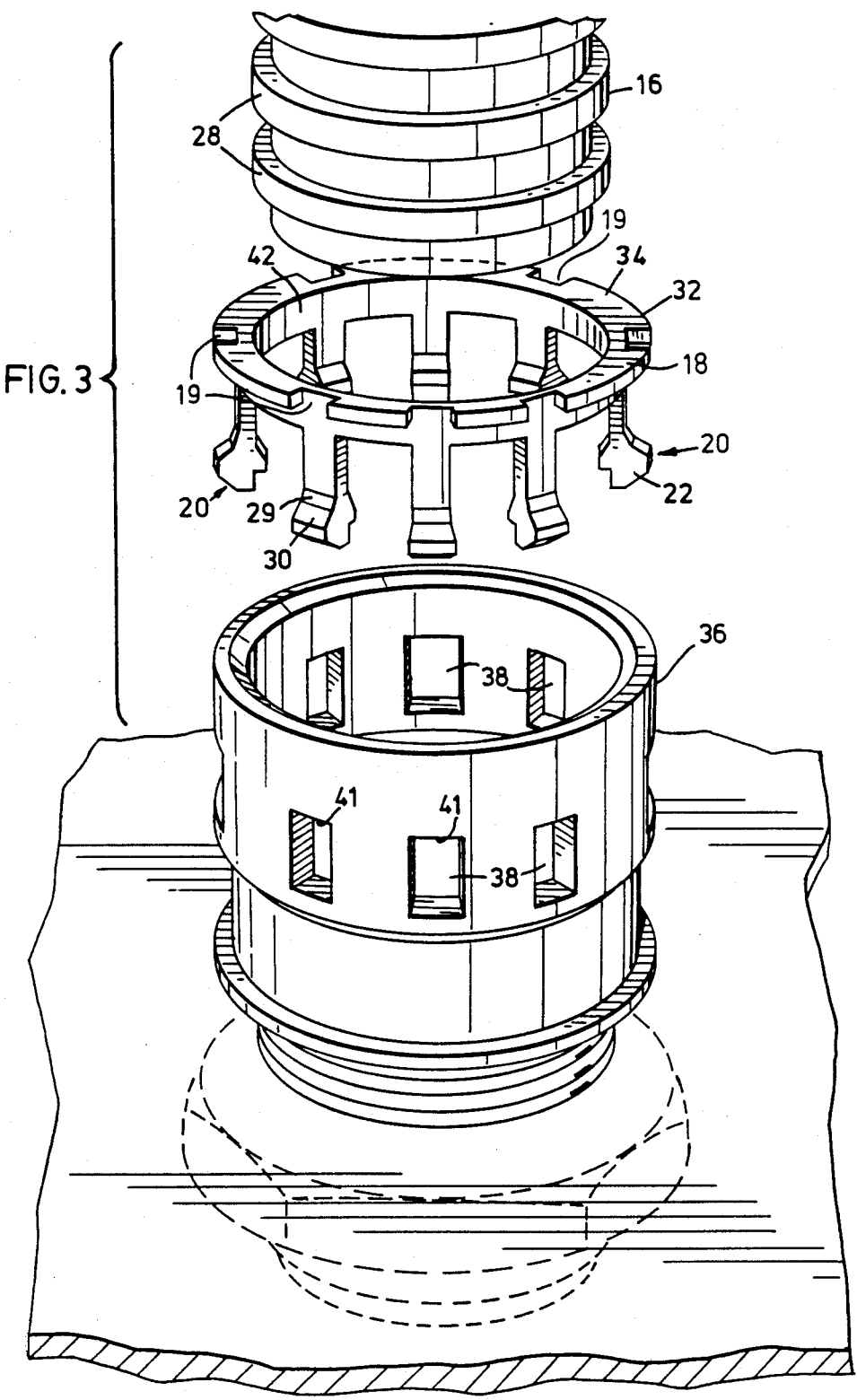

CONDUIT CONNECTOR

FIELD OF THE INVENTION

This invention is directed to a device incorporated into an end fitting such as a conduit connector or conduit coupling for use with corrugated pipe, and to a system incorporating the device.

BACKGROUND TO THE INVENTION

The use of ribbed pipe or conduit in building construction is very widespread. Normally, such ribs are on metal pipe or conduit in a spiraling continuous rib. However, plastic conduit is now being manufactured with discrete separate ribs. In many instances lengths of the pipe are joined together by couplings in end to end relation, or are coupled to junction boxes, and contain electrical wiring. It is a frequent practice to assemble such conduit components on steel reinforcing bars and then pour a layer of concrete to encase the conduit. Certain prior art arrangements do not afford sufficient integrity to the system, being subject to unintentional disconnection when accidentally trodden upon, and endangering the integrity of the system.

A further problem encountered with certain types of prior art couplings and end fittings is the possibility of concrete leakage under the described encasing situations, whereby the internal integrity of the conduit system is compromised.

Certain aspects of different types of the prior art are exemplified in the following listed U.S. Pats. Nos.:

| | | |
|---|---|---|
| 3,785,682 | Schaller et al | January 1974; |
| 3,899,198 | Maroschak | August 1975; |
| 4,084,844 | Abner | April 1978; |
| 4,248,459 | Pate et al | February 1981; |
| 4,368,904 | Lanz | January 1983; |
| 4,441,745 | Nicholas | April 1984; |
| 4,168,091 | Boomgarden | September 1979; |
| 4,443,031 | Borsh | April 1984; |
| 4,470,622 | Pate et al | September 1984; |
| 4,247,136 | Fouss et al | January 1981; |
| 4,575,132 | Nattel | March 1986; |
| 4,575,133 | Nattel | March 1986; |
| 4,067,534 | Frey | January 1978. |

SUMMARY OF THE INVENTION

The present invention provides an improved conduit system having components for coupling corrugated pipe, wherein the pipe can be connected to terminal boxes or coupled in end to end joining relation, or in "T" and other connections.

The system provides connection devices and fittings that assembly by axial insertion one within the other without necessitating the provision of assembly tools and wherein corrugated pipe may be securely assembled by simple axial insertion therein, to effect strong, substantially sealed conduit joints.

The system further provides in one aspect pipe end fittings that resist accidental disassembly, against very considerable disassembly forces, in the preferred embodiment in excess of the 150 pound tension load stipulated by the Canadian Standards Association (CSA). The pipe end fittings incorporate sealing provisions to substantially prevent leakage of concrete therepast, into the sealed interior of the conduit or associated fitting.

In an embodiment of the invention, the connection device used for securing a corrugated pipe within the fitting has an array of arcuately spaced fingers for insertion within the fitting, at least some fingers having an enlarged head thereon including an inwardly extending transverse abuttment, in use to engage a corrugation on the pipe exteriorly, and an outwardly inclined transverse cam for engagement axially against a shoulder of the fitting, in use to force the abuttment radially inwardly in axial securing relation with the pipe corrugation, while the cam engages the fitting shoulder, to preclude withdrawal of the device and the pipe from the fitting.

The array of fingers are secured to an annular ring, extending axially from the ring in the preferred embodiment, the ring having a radially outwardly extending flange, in use to engage against an axial end of the fitting, to axially position the finger heads within the fitting.

In the preferred embodiment, the radially outer axial end portions of the fingers, remote from the securing annulus ring portion, are tapered, to facilitate the insertion of the connection device into the respective fitting.

In one embodiment the connection device has a number of recesses on an accessible outer surface of the flange. These recesses serve to index the connection device when automated assembly of the connection device to a fitting is required.

It will be understood that the pipe end fitting in one aspect functions in cooperation with the connection device, the fitting having interior shoulder means located a predetermined distance from the noted axial end, to axially and radially engagethe cams on the finger heads of the device as previously during insertion of the conduit.

The connection device and the fitting have a provision for lost motion between the fitting shoulder means and the connection device finger head cams, to permit limited relative displacement of the device axially outwardly of the fitting, to activate the head cam portions in jamming relation between the pipe corrugation and the fitting interior shoulder means.

The fitting interior shoulder means can be circumferentially discontinuous, each comprising a recess within the wall of the fitting wherein the enlarged head portion of the related fingers can extend. In the preferred embodiment the recesses extend through the wall of the fitting as an annular array of apertures extending outwardly therethrough, each bounded at the aperture ends closest the axial end portion by a planar face lying in a common plane extending normal to the main axis of the fitting and constituting the shoulder means. The aperture array each provides an external recess for the finger head portions.

However, it will be understood that the interior shoulder means within the fitting could be a circumferentially continuous shoulder within the fitting.

The subject fitting can comprise a connector, for connecting a subject corrugated pipe to a junction box or other structure, or it can comprise a coupling for coupling two or more pipes in joining relation, such as a Tee piece etc.

In the preferred embodiment the subject finger head portions of the device provide the finger transverse buttress with an inclined radially inner cam guide face on the axially outward side thereof to make contact with the corrugated surface of an entering pipe and deflect the finger head portions radially outwardly, to facilitate entry of the pipe corrugation therepast.

The fitting provides radial accommodation into which the finger head portion can be thus radially outwardly deflected by the guide face camming action as the pipe corrugation passes. The buttress face on the axially and radially inward side of the head remote from the guide cam face provides a squared abutment shoulder to engage the pipe corrugation, in use to preclude withdrawal of the corrugation outwardly therepast.

The finger head portion has a radially outer cam portion, to contact the fitting shoulder means. The axially outermost portion of the cam is inclined at a first angle from the main axis of the fitting such as to generate, from making axial contact with the fitting shoulder means a predominantly radially inwardly directed component of reactive force acting upon the respective finger portion, to drive the abutment shoulder of the transverse buttress portion into jamming relation behind the adjoining pipe corrugation.

The application of withdrawing force on the pipe tends to displace the connection device axially along the fitting, bringing an adjacent portion of the subject cam into contact with the fitting shoulder means. This adjacent cam portion is inclined at a second, greater angle from the main axis of the fitting, such as to generate a predominant axially directed reaction force resisting further withdrawal of the connection device outwardly from the fitting.

The subject fitting has an annular recess shoulder therein against which the inserted inner end of the subject pipe can abut. Adjacent the recess shoulder extends an annular axially extending cylindrical surface against which one or more corrugations of a subject pipe are entered in a push-fit sealing relation therewith. The provision of such a cylindrical sealing surface having an axial extent sufficient to receive two adjacent pipe end corrugations thus provides a first seal, and a second, back up seal to preclude the entry of cement or concrete therein.

The subject construction provides highly resilient finger members of small section, to facilitate ready insertion of a corrugated pipe in entered relation therein, while affording an effective resistance against disassembly.

The multi-piece assembly permits moulding of the fixture body with integral threads, for enhanced security of fixture attachment, as compared with push-in types of attachments.

The axial floating action of the connection device within the fixture is limited in the inward direction by the outer flange portion, and in the outward, withdrawal direction by interaction of the radially outer cam portions of the finger head portions with the shoulder means of the fixture. It is the axial floating action of the connection device that brings the differential camming action into play, whereby the inserted pipe is so effectively secured.

In the preferred embodiment the fixture shoulder portions are provided by diametrically piercing the fixture with an appropriate number of apertures, to receive the corresponding number of finger head portions in radially entered relation therein.

In a second embodiment it is contemplated that the fixture shoulder portions comprise a continuous internal shoulder portion. It is further contemplated that the connection device can be inverted and inserted within a slightly modified form of the fixture, the connection device having an inturned inner end flange to engage the inserted end of the pipe, insertion-limiting relation with the pipe. The head portions of the outwardly extending finger portions also are inverted axially in relation to the fingers, in order to achieve the desired relationships with the pipe and provide the corresponding functions, in order to retain the pipe in inserted relation within the fitting. This inverted version provides access for a special tool to facilitate the release of a pipe from engagement by the connection device.

In the case of the preferred embodiment, in order to disassemble the pipe from engaged relation with the fitting it is necessary only to secure the connection device in fully inserted relation within the body of the device, such that the finger head portions can deflect radially outwardly away from the corrugations of the pipe, with the radially outer cam portions of the finger head being held axially displaced clear of the fixture shoulder portions, such that deflection of the finger portions by the pipe corrugations becomes possible, as the pipe is withdrawn.

The subject connection device in combination with a fitting and corrugated pipe forms a system, the method of assembly thereof in relation to a junction box comprising the steps of inserting an end fitting into secured engagement with the junction box, the fitting having an internal connection device inserted therein, inserting an end of a corrugated pipe axially within the fitting past a plurality of finger transverse buttress portions, and withdrawing the pipe and connection device axially within the end fitting whereby the finger portions deflect radially inwardly behind a pipe rib portion, in axial retaining relation thereagainst.

The method may further comprise the step of inserting the pipe within the fitting sufficiently far to engage at least one end corrugation thereof in entered, sealing relation within an adjoining inner passage portion of the fitting.

In developing the subject system it has been found that polyvinylchloride is suitable for molding the subject connection device and fitting. In the preferred embodiment the initial cam portion first angle of inclination, to produce large radial gripping force components is in the order of 30° from the polar axis, whereby the transverse rib is forced into radial locking engagement with the pipe corrugation. The adjoining finger head cam portion is inclined at an angle from the polar axis, in the order of 60°, whereby the connection device exerts a large axial force component to resist withdrawal of the pipe from the fitting.

The radially inner finger head portion inclined guide faces against which the pipe corrugations bear, to deflect the finger head portions clear of the pipe corrugations, is inclined from the polar axis at about 38 degrees, in the preferred embodiment.

The invention is preferably used with pipe which is corrugated with discreet, non-helical ribs which are in addition preferably placed in the plane normal to the axis of the pipe.

However, with modifications to the preferred embodiment shown the invention could be adapted to other ribbed configurations.

BRIEF DESCRIPTION OF THE DRAWINGS

Certain embodiments of the invention are described, reference being made to the accompanying drawings, wherein;

FIG. 3 is an exploded general view of the component parts of a second fitting embodiment;

DETAILED DESCRIPTION OF THE EMBODIMENTS OF THE INVENTION

Figure 2:
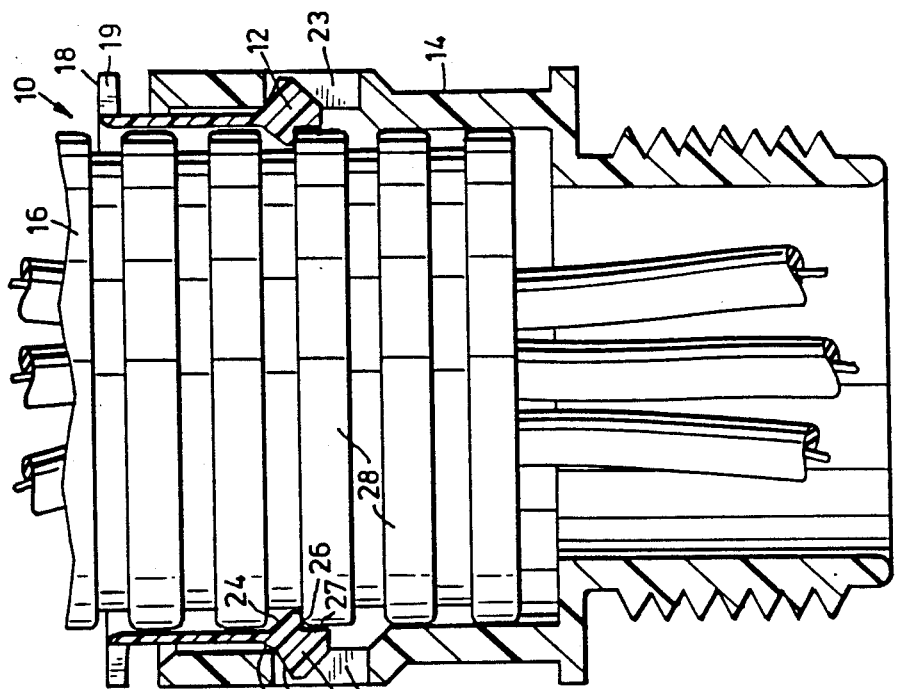
FIG. 2 is an enlarged schematic detail of the portion 2 of FIG. 1.
Figure 1:
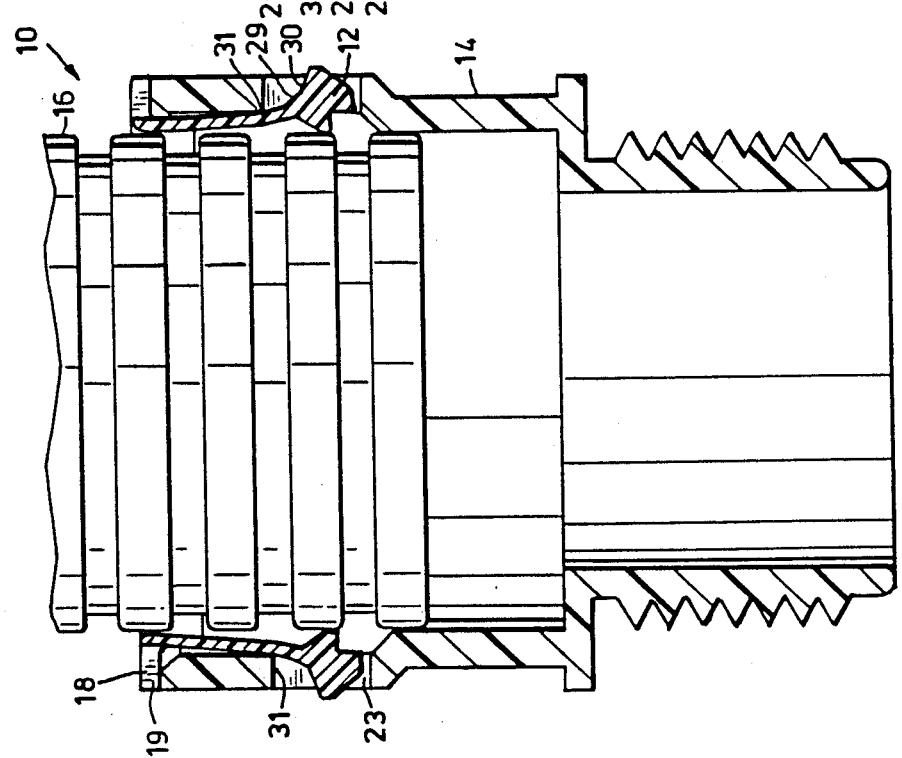
FIG. 1 is a diametrical section of a subject connection device and fitting for a junction box connector in assembled relation with a corrugated pipe.

Referring first to FIGS. 1 and 2, the arrangement 10 comprises a connection device 12 located within a fitting body 14 and having a corrugated pipe 16 in inserted relation within the fitting body 14.

The general cylindrical form of connection device 12 is illustrated also in the connection device 32 of FIG. 3.

The device 12 has a top annular flange 18 having a plurality of finger portions 20 extending axially therefrom, substantially parallel with the polar axis of body portion 14.

The top annular flange 18 has a plurality of axially extending slots 19 for indexing purposes in the automated assembly of the device 12 to a parent fitting 14.

Each finger portion 20 has an enlarged head portion 22 received within a recess 23 of body portion 14.

Referring more particular to FIG. 2 the head portion 22 has a radially inner guide cam surface 24 inclined at an angle of about 38 degrees from the polar axis, and terminating in a transverse buttress portion 26 with a face 27 which forms a retaining abuttment for a corrugation 28 of pipe 16.

On the radially outer surface of head portion 22 a first cam surface 29 is inclined at a first angle of about 30 degrees and a second cam surface 30 is inclined at an angle of about 60 degrees, both measured relative to the polar axis of the system.

Slight displacement of the device 12 axially outwardly within fitting 14 brings the first cam surface 25 into play.

A shoulder portion 31 of the fitting 14 first engages the first cam surface 29 thereby applying a large inwardly acting radial component of force acting on the head portion 22, to hold the buttress portion 26 in engaging relation with the pipe corrugation 28.

Further relative axial movement between the connection device 12 and the body portion 14 as the pipe 28 is again slightly displaced axially outwardly brings the second cam surface 30 into engaging relation with the shoulder portion 31. This now provides a reduced component of radially inwardly directed force, to maintain the buttress portion 26 in locking engagement against the pipe corrugation 28, and generates a greatly increased component of axial reaction force, to restrain the head portion 22, and with it the pipe 16.

Referring more particularly to FIG. 3 the connection device 32 has an annular skirt portion 34 illustrated as having eight finger portions 20 extending therefrom. While eight fingers are shown in FIG. 3, it has been found that six fingers may generally be sufficient for this embodiment.

Each finger portion 20 has an enlarged head portion 22 similar to that detailed in FIG. 2.

The fitting body 36 has eight apertures 38 therein each of which has an axially outer edge 41 to provide the requisite shoulder portion against which the radially outer cam surfaces 29, 30 react, as in FIG. 2. Again where six fingers are used only six aperturers 38 will be required.

Referring to FIGS. 1, 2 and 3, in use, with the connection device 12 installed within the fitting body 14 (fitting body 36 in FIG. 3), the pipe 16 can be readily inserted therein. The two leading pipe corrugations 28 form a push fit with the cylindrical surface 42, against which they effect a substantial seal.

The enlarged head portions 22 deflect outwardly as the pipe corrugation 28 bear against radially inner guide cam surfaces 24 of the head portions 22. The apertures 23, 38 (FIG. 3) receive the head portions in radially outwardly deflected relation therein, to permit ready passage of pipe 16 inwardly therepast.

Figure 4:
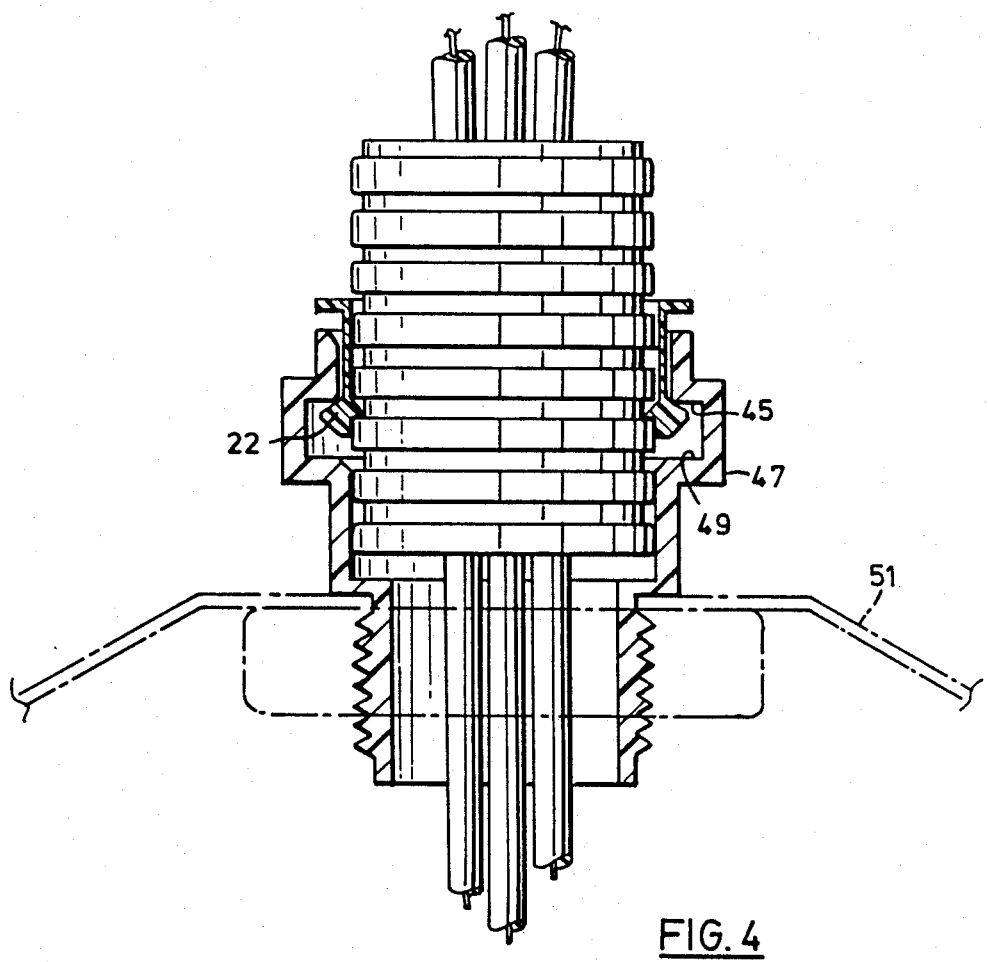
FIG. 4 is a view similar to FIG. 1 of a further fitting embodiment.

Referring to the FIG. 4 embodiment, in place of apertures 23 or 38, a continuous annular rib portion 45 forms part of an enclosure 47 having recess 49 wherein the enlarged head portions 22 can be deflected, as in the FIGS. 1, 2 and 3 embodiments.

Shown in phantom is a portion of junction box and a locknut that forms a part of the system. It will be understood that junction box 51 may have threaded apertures therein, to receive the fitting 14 in screwed relation therein.

Figure 5:
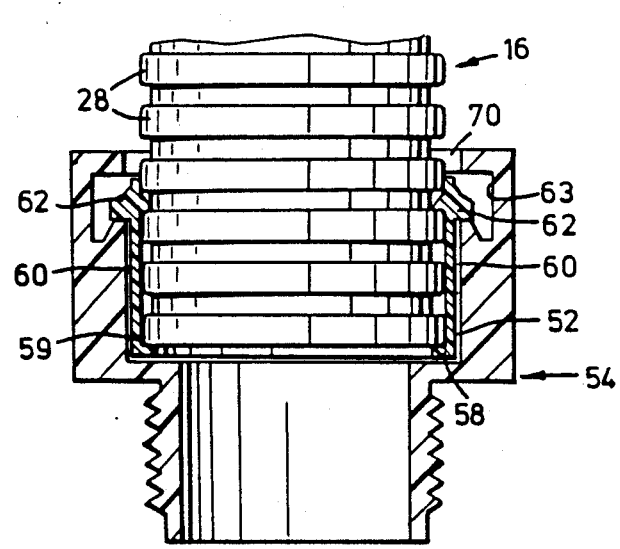
FIG. 5 is a view similar to FIG. 4 of an inverted connection device embodiment.

In the case of the FIG. 5 embodiment an inverted connection device 52 is located within a modified fitting body portion 54. An inturned flange portion 58 engages the forward end of pipe 16, having part of a cup-like seal 59 which seals against pipe 16 and body 54.

Each finger portion 60 has an enlarged head portion 62 received within a recess 63 of body portion 54.

In operation, the respective cam faces of head portion 62 function in substantially the same fashion as for the FIG. 1–4 embodiment. The proximity of head portions 62 to the annular access 70 facilitates the introduction through access 70 of a split annulus release tool, by means of which the head portions 62 can be released from the corrugations 28 of pipe 16.

Figure 6:
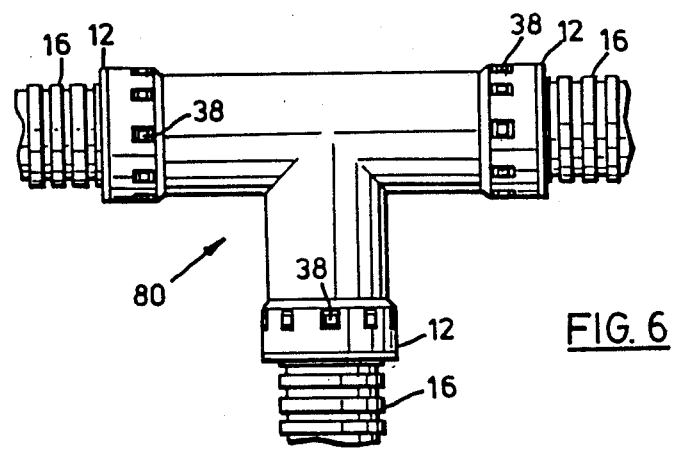
FIG. 6 is a side view of a multi-pipe coupling.

In FIG. 6 the fitting 80 comprises a Tee-connection, having three connection devices 12 therein, as indicated by the three rings of aperture 38.

It will be understood that in the system of which FIG. 4 forms a part a variety of fixtures embodying the present invention may form part of that system.

What is claimed is:

1. A connection device for securing an exteriorly corrugated pipe end within a fitting having an internal shoulder portion comprising, an array of spaced finger portions arranged arcuately about a central polar axis for insertion axially within the fitting, each finger portion having an enlarged head portion thereon including a radially inwardly extending transverse buttress in use to engage an exterior corrugation of the pipe; a first radially outwardly inclined transverse cam portion, forming a first angle with the axis, for a first engagement axially against an internal shoulder portion of the fitting, in use to force the buttress radially inwardly to engage the corrugation while the cam portion engages the fitting internal shoulder portion; and a second outwardly inclined transverse cam portion extending radially outwardly from the first cam portion and forming a second angle with the axis, the second angle being greater than the first angle, for second engagement axially against the internal shoulder portion of the fitting; in use to force the buttress radially inwardly to engage the pipe corrugation while the second cam portion engages said fitting internal shoulder portion, to preclude withdrawal of the device from the fitting.

2. The connection device as set forth in claim 1 wherein the first angle is about 30°.

3. The connection device as set forth in claim 1 wherein the second angle is about 60°.

4. The connection device as set forth in claim 1 wherein the first angle is about 30° and the second angle is about 60°.

5. The connection device as set forth in claim 1, said transverse claim 1, said transverse buttresses having an inclined cam guide face on one side thereof to facilitate entry of said pipe corrugation therepast, and an abuttment shoulder portion on the axially opposite side thereof to engage said pipe corrugation, in use to preclude withdrawal of said pipe from said device.

6. The connection device as set forth in claim 1, said finger enlarged head portion having an axially tapered first cam face at one end of the device, in use to facilitate entry of the finger of the device within said fitting.

7. The connection device as set forth in claim 6 said outwardly inclined transverse cam portion being in axial back to back relation with said first cam face, to resist withdrawal motion of said device when inserted in said fitting.

8. The connection device as set forth in claim 1, having an annular ring with said finger portions extending axially therefrom, said ring having a radially extending flange portion, in use to engage said fitting axially to position said finger head. portions in predetermined relation within the fitting.

9. The connection device as set forth in claim 8 in combination with said fitting.

10. The combination as set forth in claim 9 wherein said fitting comprises a connector.

11. The combination as set forth in claim 9, wherein said fitting comprises a coupling.

12. The combination as set forth in claim 9, said fitting having an annular axial end portion for insertion of said finger portion array in axially inserted relation therein, having an annular end face to engage said flange portion.

13. The combination as set forth in claim 12, said interior shoulder means therein positioned axially a predetermined distance from said annular end portion, to engage said head cam portion of each said finger portion.

14. The combination as set forth in claim 13, said shoulder means comprising an annular array of recesses in said fitting annular end portion, each recess receiving a said finger head portion.

15. The combination as set forth in claim 14, said recesses comprising a plurality of apertures extending outwardly through said annular end portion.

16. The combination as set forth in claim 9, said fitting having an annular shoulder therein use to receive an end of said pipe in entered abutting relation thereagainst.

17. The combination as set forth in claim 16, said fitting having an inner bore and said fitting, said inner bore providing a close sealing fit with a said pipe and having an axial extent sufficient to engage at least one adjacent corrugation adjacent the end of said pipe.

18. The combination as set forth in claim 9, including a plurality of corrugated pipes and associated said fittings comprising connectors and couplings, to form a system.

19. The system as set forth in claim 18 including a plurality of electrical conductors in inserted relation therein.

20. A connection device for securing an exteriorly corrugated pipe end having a major axis within a fitting having an internal shoulder, the device comprising an array of arcuately spaced finger portions for insertion within the fitting, each finger portion having an enlarged head portion thereon including a radially inwardly extending transverse buttress in use to engage an external corrugation on said pipe, and a first radially outwardly directed cam portion in use to axially engage an internal shoulder portion of said fitting and forming a first angle with the axis so that in use as the pipe end is withdrawn from the fitting a major component of axial withdrawal forces are directed through the head in a radial direction; and a second cam portion extending radially outwardly of the first cam portion in use to axially engage the internal shoulder portion and forming an angle with the axis greater than the first angle such that a major component of axial withdrawal forces are directed through the head in an axial direction, to preclude withdrawal of the device from the fitting.

21. The connection device as set forth in claim 20, further comprising an annular ring having an axis, in use parallel to the pipe end axis, the ring having said fingers extending axially therefrom and having a radially extending flange portion, in use to engage said fitting axially to position said finger head portions in predetermined relation within the fitting.

22. The connection device as set forth in claim 21 in combination with said fitting.

* * * * *

UNITED STATES PATENT AND TRADEMARK OFFICE
CERTIFICATE OF CORRECTION

PATENT NO. : 4,836,580

DATED : June 6, 1989

INVENTOR(S) : Grant D. Farrell

It is certified that error appears in the above-identified patent and that said Letters Patent is hereby corrected as shown below:

In column 1, line 54, change "assembly" to --assemble--.

In column 2, line 32, after "previously" insert --noted. The fitting, further, has radial clearance to accept the finger heads when outwardly deflected--.

In column 3, line 54, change "differential" to --differentiated--.

In column 3, line 68, after the comma insert --in--.

In claim 17, in column 8, line 10, insert --said annular shoulder being adjacent said inner bore of after "and".

Signed and Sealed this

Twenty-eighth Day of January, 1992

Attest:

HARRY F. MANBECK, JR.

*Attesting Officer*     *Commissioner of Patents and Trademarks*